(12) United States Patent
Pollack et al.

(10) Patent No.: US 6,539,385 B1
(45) Date of Patent: Mar. 25, 2003

(54) DUAL-USE EMAIL SYSTEM

(75) Inventors: Jordan B. Pollack, Sudbury, MA (US); Andy M. Sack, Brookline, MA (US)

(73) Assignee: Abuzz Technologies, Inc., Cambridge, MA (US)

( * ) Notice: Subject to any disclaimer, the term of this patent is extended or adjusted under 35 U.S.C. 154(b) by 220 days.

(21) Appl. No.: 09/591,517

(22) Filed: Jun. 9, 2000

Related U.S. Application Data
(60) Provisional application No. 60/138,715, filed on Jun. 11, 1999.

(51) Int. Cl.$^7$ .............................................. G06F 17/30
(52) U.S. Cl. ......................... 707/10; 705/14; 709/206; 709/318
(58) Field of Search ........................... 707/10; 709/318, 709/206; 706/47; 705/14

(56) References Cited

U.S. PATENT DOCUMENTS

| | | | |
|---|---|---|---|
| 5,283,856 A | * 2/1994 | Gross et al. | .................... 706/47 |
| 5,555,346 A | 9/1996 | Gross et al. | |
| 5,590,269 A | 12/1996 | Kruse et al. | ................ 395/209 |
| 5,619,648 A | 4/1997 | Canale et al. | .......... 395/200.01 |
| 5,642,502 A | 6/1997 | Driscoll | ...................... 395/605 |
| 5,649,186 A | 7/1997 | Ferguson | ..................... 395/610 |
| 5,706,497 A | 1/1998 | Takshashi et al. | ........... 395/605 |
| 5,717,913 A | 2/1998 | Driscoll | |
| 5,724,567 A | 3/1998 | Rose et al. | |
| 5,737,728 A | 4/1998 | Sisley et al. | .................... 705/8 |
| 5,799,304 A | 8/1998 | Miller | |
| 5,819,267 A | 10/1998 | Uyama | ........................... 707/6 |
| 5,819,269 A | 10/1998 | Uomini | ......................... 707/7 |
| 5,822,527 A | 10/1998 | Post | ...................... 395/200.36 |
| 5,826,022 A | * 10/1998 | Nielsen | ...................... 709/206 |
| 5,867,799 A | 2/1999 | Lang et al. | ..................... 707/1 |

(List continued on next page.)

OTHER PUBLICATIONS

Robert Kass, et al., "Intelligent Assistance for the Communication of Information in Large Organizations", pp. 171–178, EDS Center for Advanced Research (no date).

Ernst Lutz, et al., "MAFIA—An Active Mail–Filter–Agent for an Intelligent Document Processing Support", pp. 235–251, Multi–User Interfaces and Applications, 1990.

Thomas W. Malone, et al., "The Information Lens: An Intelligent System for Information Sharing and Coordination", pp. 65–88, Lawrence Elbaum Associates, 1989.

Marx, et al., "CLUES: Dynamic Personalized Message Filtering", pp. 113–121, MIT Media Laboratory, Speech Research Group, 1996.

Irene Stadnyk, et al., "Modeling User's Interests in Information Filters", pp. 49–50, Communications of the ACM, vol. 35, No. 12, Dec. 1992.

http://www.echomail.com/main.html, 12 pages, Printed on Aug. 4, 1999 14:16:42.

Product Summary, Inference, Knowledge Creation (no date).

*Primary Examiner*—Charles Rones
(74) *Attorney, Agent, or Firm*—Wolf, Greenfield & Sacks, P.C.

(57) ABSTRACT

A method and system are provided for use by an enterprise in which personal messages are processed differently than messages that are intended to constitute official enterprise correspondence ("enterprise messages"). An electronic communication including a message, a recipient identifier identifying at least one recipient of the message, and an status indicator indicating whether the message is a personal message or an enterprise message is received. The message is made available to the at least one recipient if the status indicator indicates that the message is a personal message. If the status indicator indicates that the message is an enterprise message, the message is stored in a searchable database and may also be made available to the at least one recipient.

23 Claims, 2 Drawing Sheets

U.S. PATENT DOCUMENTS

| | | | |
|---|---|---|---|
| 5,870,744 A | | 2/1999 | Sprague .......................... 707/9 |
| 5,909,679 A | | 6/1999 | Hall ............................... 707/4 |
| 5,923,848 A | * | 7/1999 | Goodhand et al. .......... 709/219 |
| 5,999,932 A | * | 12/1999 | Paul ............................ 707/10 |
| 6,029,195 A | | 2/2000 | Herz |
| 6,052,709 A | * | 4/2000 | Paul ............................ 709/202 |
| 6,072,942 A | * | 6/2000 | Stockwell et al. ..... 395/200.36 |
| 6,119,114 A | | 9/2000 | Smadja |
| 6,189,002 B1 | | 2/2001 | Roitblat |
| 6,212,553 B1 | * | 4/2001 | Lee et al. ..................... 709/206 |
| 6,249,805 B1 | * | 6/2001 | Fleming, III ................. 709/206 |
| 6,266,692 B1 | * | 7/2001 | Greenstein .................. 709/206 |
| 6,393,423 B1 | | 5/2002 | Goedken |
| 6,460,050 B1 | * | 10/2002 | Pace et al. ................ 707/104.1 |
| 2002/0010804 A1 | * | 1/2002 | Sanghvi et al. .............. 709/318 |
| 2002/0016735 A1 | * | 2/2002 | Runge et al. ................ 705/14 |
| 2002/0019851 A1 | * | 2/2002 | Pollack ....................... 709/206 |

* cited by examiner

DUAL-USE EMAIL SYSTEM

CROSS-REFERENCE TO RELATED APPLICATIONS

This application claims the benefit under 35 U.S.C. §119 (e) of prior U.S. Provisional Application Ser. No. 60/138,715, filed Jun. 11, 1999, which is hereby incorporated by reference.

This application is related to the following commonly owned applications, some of which disclose subject matter related to the disclosure of the present application, and which are hereby incorporated by reference in their entirety: U.S. Utility patent application Ser. No. 09/330,779 and entitled "METHOD AND APPARATUS FOR DISTRIBUTING INFORMATION TO USERS," filed Jun. 11, 1999.

BACKGROUND

In conventional electronic mail (email) systems, a user (the "sender") sends a message to one or more specified recipients. The sender composes the message using an email client and specifies the identities of the intended recipients. The email client sends the email message and associated information, such as the identities of the intended recipients, to an email server. The email server sends the email message to the recipients over a network, such as a Local Area Network (LAN), an intranet, or an internet (such as the public Internet). In such a system, the message is transmitted only to those recipients specified by the sender and is stored only in the personal outbox of the sender and personal inboxes of the recipients. As a result, the message can be accessed only by the sender and the recipients specified by the sender.

Conventional email systems are often used within an enterprise to exchange both personal and enterprise-related email messages. For example, an employee in an enterprise may use the enterprise's email system to send a personal message to another employee regarding a social event that is unrelated to business of the enterprise or to provide personal views and opinions on business issues. Users also, however, use the enterprise email system to exchange email regarding official enterprise business, such as policies and procedures of the enterprise and minutes of meetings.

Conventional email systems cannot distinguish between personal e-mail messages and email messages that represent official enterprise correspondence. As a result, conventional email systems typically transmit, process, and store email messages representing both personal correspondence and official enterprise correspondence in the same manner. For example, if it is the policy of an enterprise to archive all email messages for one year, then email messages representing both personal correspondence and official enterprise correspondence are archived for one year. Furthermore, enterprises wishing to retain property rights to official enterprise correspondence often choose to enact policies that regard all email messages—both personal and official—transmitted using the enterprise's email system as the property of the enterprise, because such systems lack any reliable way to automatically distinguish between personal correspondence official enterprise correspondence.

Lack of an ability to automatically distinguish between personal messages and official enterprise correspondence leads to various problems. First, some employees consider company review of email messages to be an invasion of privacy. Because the enterprise is unable to separate personal messages from official enterprise correspondence automatically (i.e., without reviewing the contents of the messages), privacy concerns therefore prevent the enterprise from productively analyzing and processing email containing official enterprise correspondence. Some enterprises treat all email messages transmitted within the enterprise email system as official enterprise correspondence. Such a policy, however, might result in the enterprise being held legally responsible for the contents of such email messages, even if such messages were intended by their senders and recipients to constitute purely personal communications. The enterprise might thus be exposed to legal liability for claims, such as sexual harassment or fraud, arising out of such purely personal messages. Some enterprises archive both personal correspondence and official enterprise correspondence together for an extended period of time. Personal correspondence that is archived may be uncovered at a later date, such as during the discovery phase of litigation, and used against the enterprise as if the correspondence were official enterprise correspondence.

SUMMARY

A method and system are provided for use by an enterprise in which personal messages are processed and/or stored differently than messages that are intended to constitute official enterprise correspondence (referred to as "enterprise messages"). For example, personal messages may be made available only to specified recipients (e.g., by storing the personal messages in the inboxes of the specified recipients), while enterprise messages may be stored in a searchable database accessible to members of the enterprise. The sender of a message may indicate whether the message is a personal message or an enterprise message and thereby affect how the message is processed.

In one aspect, a method is provided that sends an electronic communication including a message, a recipient identifier identifying at least one recipient of the message, and a status indicator indicating whether the message is a personal message or an enterprise message is received. The message is sent to the at least one recipient if the access identifier indicates that the message is a personal message. If the access identifier indicates that the message is an enterprise message, the message is sent to a searchable database and also may be sent to the at least one recipient. Other aspects of the invention include a system and computer-readable medium that perform the same functions as those described above.

Other aspects of the invention include the various combinations of one or more of the foregoing aspects of the invention, as well as the combinations of one or more of the various embodiments thereof as found in the following detailed description or as may be derived therefrom. The foregoing aspects of the invention also have corresponding computer-implemented processes which are also aspects of the present invention. Other embodiments of the present invention may be derived by those of ordinary skill in the art both from the following detailed description of a particular embodiment of the invention and from the description and particular embodiment of a system in accordance with the invention.

DETAILED DESCRIPTION

A method and system are provided for use by an enterprise in which personal messages are processed and/or stored differently than messages that are intended to constitute official enterprise correspondence (referred to as "enterprise messages"). For example, personal messages may be made available only to specified recipients (e.g., by storing the personal messages in the inboxes of the specified recipients), while enterprise messages may be stored in a searchable database accessible to members of the enterprise. Enterprise messages may also be made available to specified recipients. The sender of a message may indicate whether the message is a personal message or an enterprise message and thereby affect how the message is processed.

Other kinds of differential processing may also be applied to personal messages and enterprise messages. For example, different retention or archiving policies may be applied to personal and enterprise messages. The system may differentiate between personal messages and enterprise messages without inspecting the contents of the message. For example, a user may provide a status indicator to the system indicating whether a message is a personal or an enterprise message. The system may determine whether to process the message as a personal message or an enterprise message based on the status indicator, without inspecting the contents of the message. Alternatively, the user may, for example, indicate that a message is an enterprise message by specifying that the message is to be delivered to a special email address that the system associates with enterprise messages. When the system receives a message directed to the special email address, the system processes the message as an enterprise message.

Enterprise messages are messages that are intended by their senders to constitute official enterprise correspondence. For example, enterprise messages may include office memoranda, policies, reports, newsletters, and other messages pertaining to the activities of the enterprise. As described in more detail below, the sender of a message may provide an indication that the message is to be treated as an enterprise message. In contrast, personal messages are messages that are intended by their senders to constitute purely personal correspondence.

An enterprise includes any group of people organized to pursue a common goal or perform a task. Enterprises include, for example, for-profit and non-profit companies, educational institutions, civic organizations, clubs and associations, and subdivisions and combinations thereof.

Figure 1:
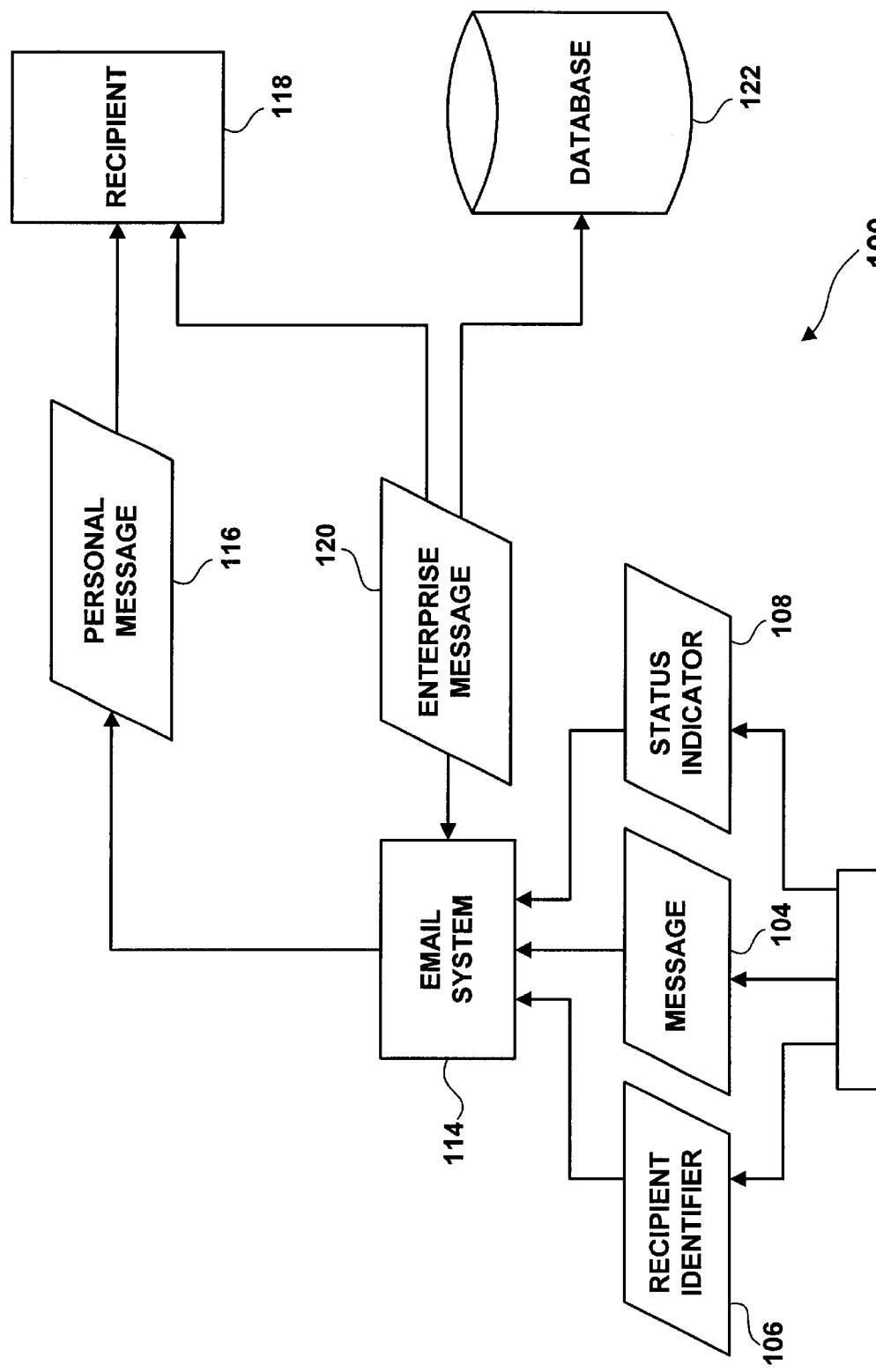
FIG. 1 is a data flow diagram of a "dual-use" electronic mail system.

Referring to FIG. 1, an example system 100 for processing and/or storing personal and enterprise messages will now be described. In the system 100, a sender 102 provides a message 104 to an email system 114. For example, in one embodiment the email system 110 includes an email client and email server in communication with each other, such as over a network. The email client 114 may be a standard email client application program, such as Eudora or Microsoft Outlook, executing on a personal computer. The sender 102 (i.e., a user of the email system 114) generates the message 104 using a text editor provided by the email system 114. The sender 102 also provides to the email system 114 a recipient identifier 106 identifying a recipient 118 of the message 104. In one embodiment, the sender 102 provides the recipient identifier 106 by typing an electronic mail address of the recipient 118 in a "To:" field of the message 104. The recipient identifier 106 may identify multiple recipients, including recipients who are to receive "carbon" copies ("cc:") of the message 104 and blind "carbon" copies ("bcc:") of the message 104.

The sender 102 may also provide a status indicator 108 to the email system 114 indicating the status of the message.

The status indicates whether the message 104 is a personal message or an enterprise message. For example, in one embodiment, in which the email system 114 is an enterprise email system used to communicate among employees of a company, the status indicator 108 indicates whether the message 104 constitutes personal correspondence or official enterprise correspondence. If the email system 114 includes an email client and an email server, the email client transmits information representing the message 104, the recipient identifier 106, and the status indicator 108 to the email server.

The sender 102 may provide the email system 114 with the status indicator 108 in any of a variety of ways. In one embodiment, the email system 114 provides a check box during composition of the message 104 which the sender 102 may check to indicate that the message 104 is an enterprise message or leave unchecked to indicate that the message 104 is a personal message. Alternatively, the email system 114 may query the sender 102 about the status (i.e., personal or enterprise) of the message 104 prior to transmitting the message 112 to the email system 114. Alternatively, the user may, for example, indicate that the message 104 is an enterprise message by specifying that the message 104 is to be delivered to a special email address that the email system 114 associates with enterprise messages. When the email system 114 receives the message 104 directed to the special email address, the email system 114 processes the message 104 as an enterprise message. Providing the sender 102 with a simple means for specifying the status of the message 104 both simplifies the process of distinguishing personal from enterprise messages and respects the privacy of the sender 102 by allowing the sender to specify the status of the message 104.

Figure 2:
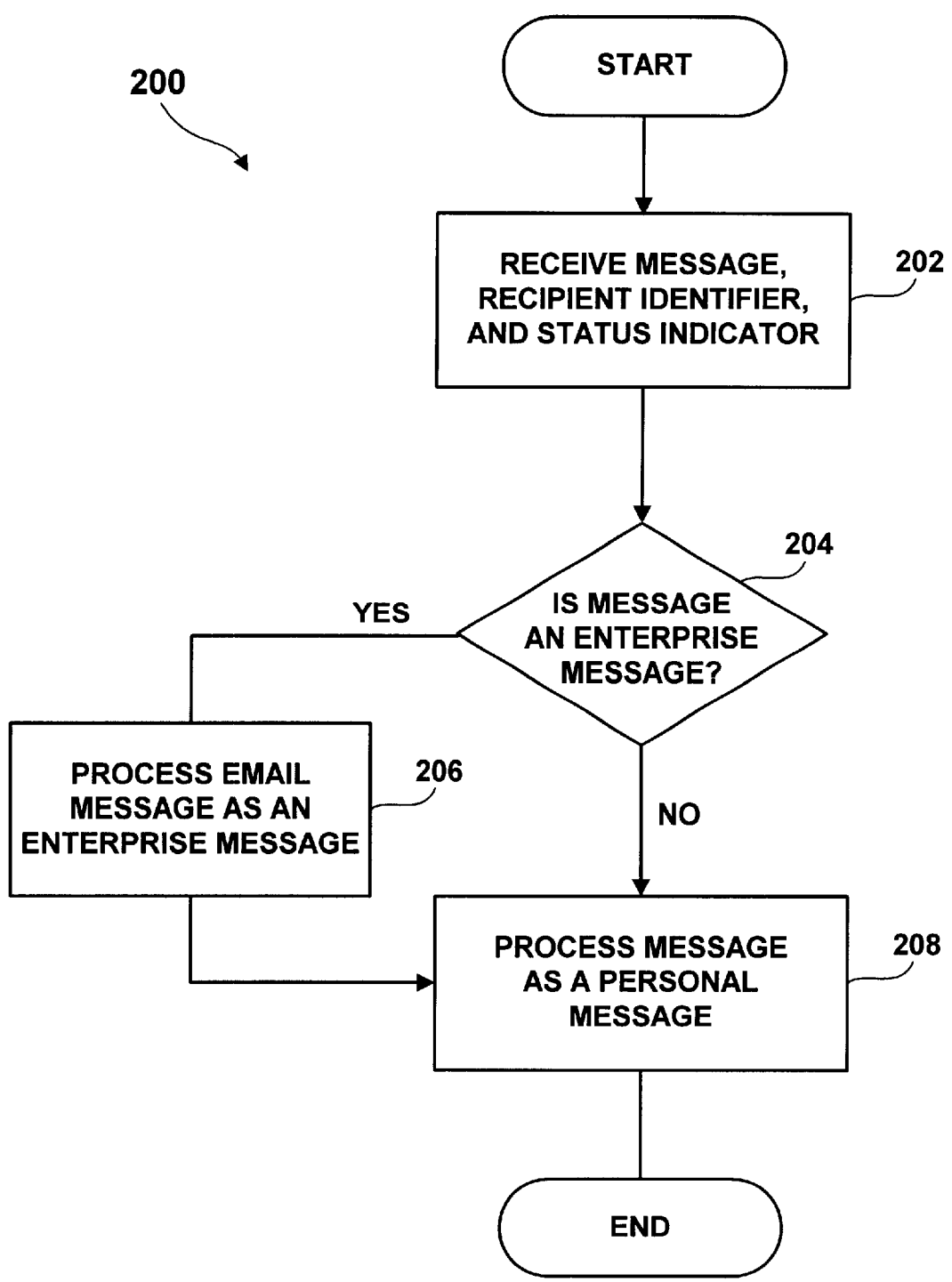
FIG. 2 is a flowchart of a method for processing email messages.

Referring to FIG. 2, an example process 200 to process the message 104 is shown. Although the process 200 is described herein as being executed by the email system 114, the process 200 may be executed by any other computer-implemented process or processes alone or in combination. For example, the process 200 may be executed by an email client or by a web server with a "mailto:" Uniform Resource Locator (URL) processing script. The email system 114 receives the message 104, the recipient identifier 106, and the status indicator 108 (step 202). The email system 114 determines whether the message 104 is an enterprise message (step 204). The email system 114 may make this determination by, for example, examining the status indicator 108. If the message 104 is not an enterprise message, the email system 114 processes the message 104 as a personal message (step 208). For example, the email system 114 may transmit the message 104 to the recipient 118 identified by the recipient identifier 106. If the message is an enterprise message, the email system 114 processes the message 104 as an enterprise message (step 206). For example, the email system 114 may transmit the message 104 as an enterprise message 120 to a database 122 and then transmit the message 104 as a personal message 116 to the recipient 118 identified by the recipient identifier.

The personal message 116 transmitted by the email system 114 to the recipient 118 can be read only by the recipient 118. In contrast, the enterprise message 120 transmitted by the email system 114 to the database 122 is stored in the database 122 for subsequent retrieval, potentially by parties other than the recipient 118. For example, the database 122 may be used by an enterprise as an email archive to store all email messages that constitute official enterprise correspondence. The database 122 may be used for any of a number of purposes. For example, in the event of a system crash, the database 122 may be used to recover official enterprise correspondence lost in the crash. The database 122 may be configured to be searchable, so that users of the email system 114 can search the database 122 for official enterprise correspondence, such as policies, reports, and memoranda.

The different processing of personal messages (such as personal message 116) and enterprise messages (such as enterprise message 120) by the email system 114 has several advantages. For example, an enterprise may decide to treat enterprise messages as the property of the enterprise and to treat personal messages as the property of the sender and/or recipient. Such a policy has the advantages of respecting the privacy of the sender and recipient while insulating the enterprise from responsibility for the content of personal messages. Another advantage of the email system 114 is that it enables an enterprise to apply different processing to email messages based on whether they are personal messages or enterprise messages. For example, a company may choose to automatically convert all enterprise messages into Hypertext Markup Language (HTML) for distribution over the enterprise intranet. The email system 114 enables an enterprise to perform such conversion only on enterprise messages and not on personal messages by automatically separating personal messages from enterprise messages. Similarly, an enterprise may choose to apply data mining techniques to all enterprise messages to, for example, create an index of topics discussed in enterprise messages. The email system 114 enables the enterprise to perform such data mining only on enterprise messages.

The ability to apply different processing to personal and enterprise messages has multiple benefits. First, it improves the speed with which the processing (e.g., HTML conversion) can be performed by applying the processing only to those documents to which the processing is intended to be applied. Second, the ability to apply certain processing only to official enterprise correspondence enables the application of certain processing to such documents that would otherwise be prohibited due to privacy concerns. For example, if an enterprise desires to automatically post all official enterprise correspondence to the enterprise intranet but does not have the ability to separate personal messages from enterprise messages, the enterprise may choose not to post any messages to the intranet out of concern for inadvertently posting personal messages. The email system 114 would allow such an enterprise to automatically post only official enterprise correspondence to the enterprise intranet without raising any privacy concerns.

A further advantage of the ability to apply different processing to personal and enterprise messages is that it enables an enterprise to apply different policies to personal and enterprise messages. For example, an enterprise may easily use the email system 114 to implement a policy under which deleted personal messages are removed from the system 100 after a short period of time (e.g., 100 days) while enterprise messages are retained for a longer period of time (e.g., 2 years). Such a policy could be used to bring treatment of email messages into line with the enterprise treatment of more traditional paper and telephone communications.

Various modifications may be made to the elements of the system 100 shown in FIG. 1 including, but not limited to, the following. The message 104, recipient identifier 106, and the status indicator 108 may be combined or further divided into one or more elements that perform the same functions. For example, the recipient identifier 106 may include a special email address that indicates that the message 104 has the status of an enterprise message. The email system 114 may include means for generating the message 104 and recipient identifier 106 (such as a text editor) and the status indicator 108 (such as a check box or other graphical user interface component), or be provided with one or more of these elements from another source.

The email system 114 may be divided into one or more components that perform the same functions. For example, the email system 114 may include an email client in communication with an email server. The email client may, for example, be any of a number of commercially available email clients, such as Eudora, Outlook, cc:mail, GroupWise, or QuickMail. The email client may include a first email client for sending personal messages and a second email client for sending official company email messages. Similarly, the email system may include a first email server for serving personal messages and a second email server for serving official company email messages. The message 104 may be transmitted by the email client to the email between server in its entirety or be divided into segments (e.g., TCP/IP packets). Communication between the email system 114 and the database 122 may be according to any communications protocol and be transmitted over any kind of communications network.

The database 122 may be any kind of database, such as a flat file database, a relational database, an object database, or any combination thereof. The database 122 may be searchable using any database searching language, such as Structured Query Language (SQL).

A computer system for implementing the system 100 of FIG. 1 typically includes at least one computer connected to both an output device which displays information to a user and an input device which receives input from a user. For example, the email client 110 may be provided on such a computer. The computer generally includes a processor connected to a memory system via an interconnection mechanism. The input device and output device also are connected to the processor and memory system via the interconnection mechanism.

One or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, and data input devices such as sensors. The invention is not limited to the particular input or output devices used in combination with the computer system or to those described herein.

The computer system may be a general purpose computer system which is programmable using a computer programming language, such as C++, Java, or other language, such as a scripting language or assembly language. The computer system may also include specially programmed, special purpose hardware. In a general purpose computer system, the processor is typically a commercially available processor, of which the series x86, Celeron, and Pentium processors, available from Intel, and similar devices from AMD and Cyrix, the 680X0 series microprocessors available from Motorola, the PowerPC microprocessor from IBM and the Alpha-series processors from Digital Equipment Corporation, are examples. Many other processors are available. Such a microprocessor executes a program called an operating system, of which Windows NT, Linux, UNIX, DOS, VMS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

The invention is not limited to a particular computer platform, particular processor, or particular high-level programming language. Additionally, the computer system may be a multiprocessor computer system or may include multiple computers connected over a computer network. The email system 114 in FIG. 1 may be embodied as separate modules of a computer program, or may be embodied in separate computer programs. Such modules may be operable on separate computers. Data (e.g. 104, 106, 108, 116, and 120) may be stored in a memory system or transmitted between computer systems. The invention is not limited to any particular implementation using software or hardware or firmware, or any combination thereof. The various elements of the system, either individually or in combination, may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

Having now described a few embodiments, it should be apparent to those skilled in the art that the foregoing is merely illustrative and not limiting, having been presented by way of example only. Numerous modifications and other embodiments are within the scope of the invention.

What is claimed is:

1. A computer-implemented method comprising steps of:
   (A) receiving an electronic communication including a message, a recipient identifier identifying at least one recipient of the message, and a status indicator indicating whether the message is a personal message or an enterprise message;
   (B) making the message available to the at least one recipient if the status indicator indicates that the message is a personal message; and
   (C) storing the message in a searchable enterprise database only if the status indicator indicates that the message is an enterprise message.

2. The method of claim 1, wherein the step (B) comprises a step of:
   (B)(1) sending the message to the at least one recipient.

3. The method of claim 1, wherein the step (C) comprises a step of:
   (C)(1) sending the message to the at least one recipient.

4. A computer-implemented method comprising steps of:
   (A) receiving an electronic communication including a message, a recipient identifier identifying at least one recipient of the message, and a status indicator indicating whether the message is a personal message or an enterprise message;
   (B) making the message available to the at least one recipient if the status indicator indicates that the message is a personal message;
   (C) storing the message in a searchable database if the status indicator indicates that the message is an enterprise message; and
   (D) providing access to the database to a user other than the at least one recipient.

5. A computer-implemented method comprising steps of:
   (A) receiving a communication including a message, a recipient identifier identifying at least one recipient of the message, and a status indicator indicating whether the message is a personal message or an enterprise message;
   (B) applying a first process to the message if the status indicator indicates that the message is an enterprise message; and
   (C) applying a second process different than the first process to the message if the status indicator indicates that the message is a personal message.

6. The method of claim 5, wherein the first process comprises making the message accessible to a user other than the at least one recipient.

7. The method of claim 5, wherein the first process comprises storing the message in a particular database.

8. The method of claim 5, wherein the first process comprises retaining the message in a system beyond a specified period of time.

9. The method of claim 5, wherein the first process comprises data mining to create an index of topics discussed in enterprise messages.

10. The method of claim 5, wherein the first process comprises posting the message to an intranet.

11. The method of claim 10, wherein the intranet comprises an enterprise intranet.

12. The method of claim 5, wherein the first process comprises converting the message into HTML for distribution over an intranet.

13. The method of claim 5, wherein the second process comprises making the message available to only the at least one recipient.

14. The method of claim 5, further comprising:
   (C) determining whether the status indicator indicates that the message is an enterprise message or a personal message.

15. A computer readable medium encoded with a program for execution on a host computer, the computer program, when executed on the host computer, performs a method comprising steps of:
   (A) receiving an electronic communication including a message, a recipient identifier identifying at least one recipient of the message, and a status indicator indicating whether the message is a personal message or an enterprise message;

(B) making the message available to the at least one recipient if the status indicator indicates that the message is a personal message; and (C) storing the message in a searchable enterprise database only if the status indicator indicates that the message is an enterprise message.

16. The computer readable medium of claim 15, wherein the step (B) comprises a step of:

(B)(1) sending the message to the at least one recipient.

17. The computer readable medium of claim 15, wherein the step (C) comprises a step of:

(C)(1) sending the message to the at least one recipient.

18. A computer readable medium encoded with a program for execution on a host computer, the computer program, when executed on the host computer, performs a method comprising steps of:

(A) receiving an electronic communication including a message, a recipient identifier identifying at least one recipient of the message, and a status indicator indicating whether the message is a personal message or an enterprise message;

(B) making the message available to the at least one recipient if the status indicator indicates that the message is a personal message;

(C) storing the message in a searchable database if the status indicator indicates that the message is an enterprise message; and (D) providing access to the database to a user other than the at least one recipient.

19. A system for processing electronic mail messages in an enterprise, the system comprising:

a searchable enterprise database storing enterprise messages; and an electronic mail system to store an electronic mail message in the enterprise database only if a status indicator associated with the electronic mail message indicates that the electronic mail message is an enterprise message and to make the electronic mail message available to a recipient of the electronic mail message if the status indicator indicates that the electronic mail message is a personal message.

20. An electronic mail system comprising:

means for receiving an electronic communication including a message, a recipient identifier identifying at least one recipient of the message, and a status indicator indicating whether the message is a personal message or an enterprise message;

means for making the message available to the at least one recipient if the status indicator indicates that the message is a personal message; means for storing the message in a searchable database if the status indicator indicates that the message is an enterprise message; and means for providing access to the database to a user other than the at least one recipient.

21. An electronic mail system comprising:

means for receiving an electronic communication including a message, a recipient identifier identifying at least one recipient of the message, and a status indicator indicating whether the message is a personal message or an enterprise message;

means for making the message available to the at least one recipient if the status indicator indicates that the message is a personal message; and means for storing the message in a searchable enterprise database only if the status indicator indicates that the message is an enterprise message.

22. The electronic mail system of claim 21, wherein the means for making the message available comprises:

means for sending the message to the at least one recipient.

23. The electronic mail system of claim 21, wherein the means for storing comprises:

means for sending the message to the at least one recipient.

* * * * *